United States Patent [19]

Kasuga

[11] Patent Number: 5,109,720
[45] Date of Patent: May 5, 1992

[54] FEED UNIT APPARATUS

[75] Inventor: Shinichi Kasuga, Maebashi, Japan

[73] Assignee: Nippon Seiko Kabushiki Kaisha, Tokyo, Japan

[21] Appl. No.: 486,079

[22] Filed: Feb. 28, 1990

[30] Foreign Application Priority Data

Mar. 3, 1989 [JP] Japan .................. 1-24391[U]

[51] Int. Cl.⁵ .............. F16H 27/02; F16J 9/00; F16B 7/10
[52] U.S. Cl ................... 74/89.15; 74/17.8; 74/566; 277/80; 384/45; 403/80
[58] Field of Search ............ 384/15, 45, 446; 277/80; 74/17.8, 566, 89.15; 403/80, 82, 109, DIG. 1

[56] References Cited

U.S. PATENT DOCUMENTS

| 1,937,985 | 12/1933 | Schnuck | 384/15 |
| 2,303,438 | 12/1942 | Cornelius | 384/15 |
| 3,820,446 | 6/1974 | Granbom et al. | 92/88 |
| 4,481,869 | 11/1984 | Garlapaty | 92/88 |
| 4,512,208 | 4/1985 | Lipinski et al. | 74/89.15 |
| 4,552,483 | 11/1985 | Anderka et al. | 403/288 |
| 4,582,371 | 4/1986 | Mottate | 384/45 |
| 4,616,885 | 10/1986 | Komiya | 384/15 |
| 4,704,913 | 11/1987 | Zimmer | 74/89.17 |
| 4,706,510 | 11/1987 | Zimmer | 74/89.21 |
| 4,859,085 | 8/1989 | Buessinger et al. | 384/45 |

FOREIGN PATENT DOCUMENTS 61-61362  4/1986  Japan .

Primary Examiner—Allan D. Herrmann
Assistant Examiner—David W. Laub
Attorney, Agent, or Firm—Basile and Hanlon

[57] ABSTRACT

A nut block, which is driven by a feed screw shaft and which is movable axially within a guide rail having a U-shaped cross section, is provided with extending portions extending laterally from both upper side portions thereof. The extending portions are positioned near the upper surfaces of both side walls of the guide rail to cover these upper surfaces. A flexible seal plate of a magnetic material is provided to cover the whole length of the opening in the guide rail. The seal plate forms an expanded portion expanding upwardly at a portion corresponding to the nut block with the movement of the nut block. The seal plate has opposite ends respectively fixed to opposite axial ends of the guide rail. Both edge portions of the seal plate are attracted to rubber magnets mounted on the upper surfaces of the side walls of the guide rail.

2 Claims, 5 Drawing Sheets

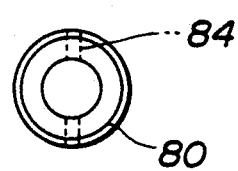
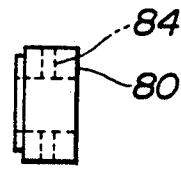
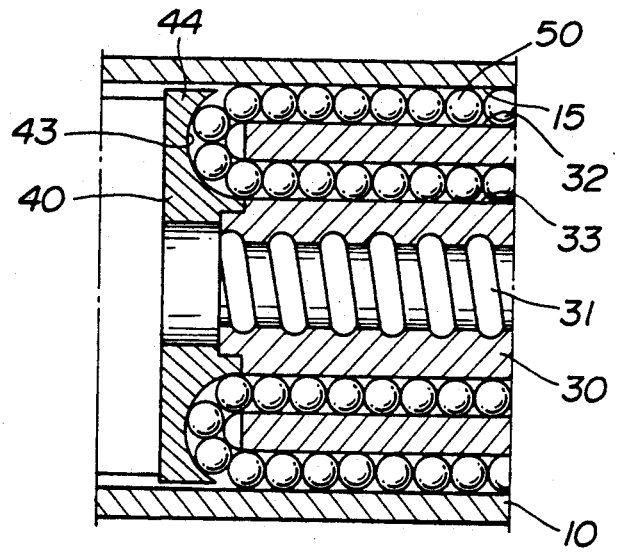
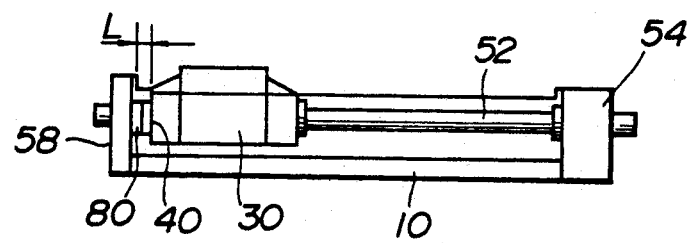

FEED UNIT APPARATUS

BACKGROUND OF THE INVENTION

1. Field of the Invention

The present invention relates to an improvement in a feed unit apparatus in which a feed screw apparatus and a linear guide apparatus are integrally formed.

2. Description of the Prior Art

In an apparatus for accurately moving a movable member relative to a stationary member in an axial direction, it is preferable to constitute the apparatus by combining a feed screw apparatus with a linear guide apparatus. However, since these apparatuses are manufactured entirely separately, in combining these apparatuses, a movement axis line of a nut due to a feed screw and a movement axis line of the nut guided by a guide rail of a linear guide must be aligned. Accordingly, there exists a problem in that a troublesome adjustment is needed in assembling both the apparatuses. For this reason, it has been proposed to constitute a feed unit apparatus by integrating the feed screw apparatus with the linear guide apparatus to facilitate the use.

For example, as shown in FIG. 2 in Japanese Utility Model Laid-Open Publication No. 61-61362, a recess of a trapezoidal shape is formed in a lower part of a nut of a ball screw, and axial ball rolling grooves are formed in the recess. The nut is fitted through balls on a guide rail of a long square column shape having ball rolling grooves respectively opposing the ball rolling grooves of the nut so that the nut is movable in an axial direction through rolling of the balls.

However, in the prior art feed unit apparatus, since a dust seal is not satisfactory, there exists a problem in that when the feed unit apparatus is used in a welding robot, weld sputters are apt to enter the ball rolling surfaces resulting in malfunction, and when it is used in a clean room, lubrication grease tends to be scattered. Furthermore, a drawback is involved in that the assembling and adjustment of the feed unit apparatus is not so simple.

SUMMARY OF THE INVENTION

The present invention was made to overcome the above-mentioned drawbacks, and it is an object of the invention to provide a feed unit apparatus which is excellent in dust sealing properties and which is easy in assembling and adjustment.

A feed unit apparatus of the present invention comprises a guide rail having a continuous length and a U-shaped cross section opening upwardly, the guide rail having ball rolling grooves opposing each other and formed in inner surfaces of side walls; a nut block having ball rolling grooves formed in both lateral sides respectively opposing the ball rolling grooves of the guide rail and having through holes serving as ball return paths respectively corresponding to the ball rolling grooves of the nut block; end caps respectively fixed to opposite axial ends of the nut block, each of the end caps having ball circulating paths respectively communicating with corresponding ones of the ball rolling grooves of the nut block and the ball return paths; a plurality of balls rollably fitted between the ball rolling grooves of the guide rail and the ball rolling grooves of the nut block; and a support unit fixed to one end of the guide rail for supporting a feed screw shaft engaged into the nut block rollably and axially unmovably. The nut block is provided with extending portions extending laterally and outwardly from both upper and side portions thereof. The extending portions are respectively positioned close to upper ends of both of the side walls of the guide rail to cover the upper ends of the side walls. A flexible seal plate made of a sheet plate has an expanded portion expanding upwardly at a portion corresponding to the nut block. The seal plate covers the opening at the upper portion of the guide rail.

The seal plate may be made of a magnetic material, and magnets may be provided on the upper ends of both the side walls of the guide rail so as to insure close contact between the seal plate and the guide rail.

Furthermore, a slant surface may be provided on an upper part of each of the end caps to slide on an inner surface of a curved portion of the seal plate, and the nut block may be formed with guide grooves respectively in the laterally extended portions to allow upper surfaces of both side edge portions of the seal plate to slidingly move thereon.

Furthermore, a stopper means may be provided to limit the range of movement of the nut block to prevent the nut from biting a member at an end of the feed screw shaft and to prevent the seal plate from being applied with excessively large stress.

In the present invention, a nut block is disposed in the inside of a guide rail of a U-shaped cross section and movable in an axial direction through rolling balls. The nut block is provided with laterally extending portions positioned close to and to cover upper ends of side walls of the guide rail. A seal plate is provided which expands upwardly at the laterally extending portions to cover the nut block and which covers an opening between both of the side walls of the guide rail over the whole length of the opening. Owing to this structure, dust is prevented from entering the surfaces of ball rolling grooves from the outside, and scattering of grease to the outside due to rotation of a feed screw is also prevented by the seal plate.

When the seal plate is made of a magnetic material and magnets are provided on the upper ends of both the side walls of the guide rail, the seal plate is attracted magnetically to the guide rail and is in close contact with the guide rail.

By providing a slant surface on the upper portion of each end cap so that the slant surface slides on an inner surface of a curved portion of the expanding portion of the seal plate, the sliding resistance of the seal plate with respect to the end cap is stabilized. Furthermore, when guide grooves are formed respectively in the laterally extending portions of the nut block to slidingly guide both lateral edge portions of the seal plate, a curvature of the seal plate is stabilized and, at the same time, dust is prevented from entering the back side of the seal plate.

BRIEF DESCRIPTION OF THE DRAWINGS

FIGS. 9 and 10 are respectively side and front views of the stopper;

FIG. 11 is a sectional view taken along the line II—II in FIG. 3, with the feed screw shaft 52 and the balls of the ball screw omitted;

FIG. 12 is a schematic diagram useful to explain the operation of the feed unit apparatus of FIG. 1;

DESCRIPTION OF THE PREFERRED EMBODIMENTS

Figure 1:
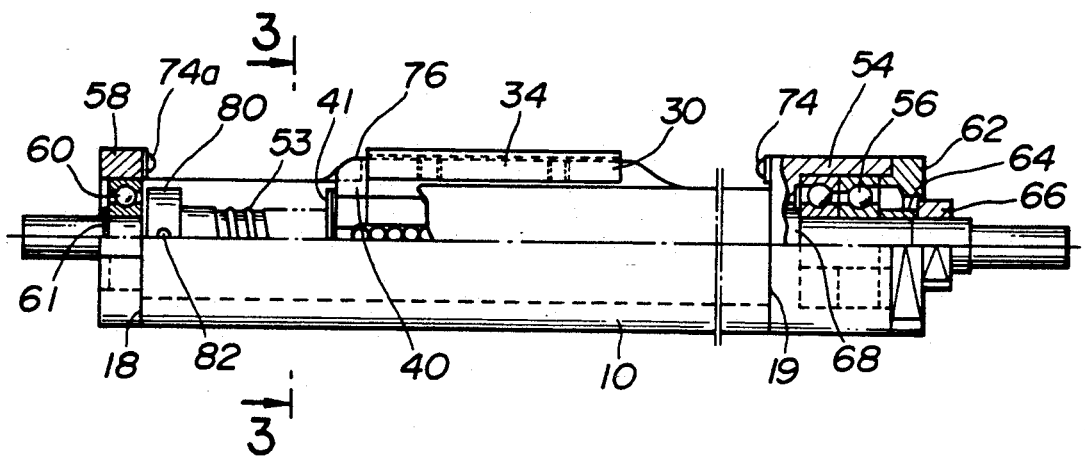
FIG. 1 is a front view partially in longitudinal cross section of an embodiment of a feed unit apparatus of the present invention.

As shown in FIGS. 1-12, a guide rail 10 is a member of a continuous length having a U-shaped cross section and an opening which opens upwardly. A bottom portion 11 of the guide rail 10 is formed with a plurality of apertures 12 for fixing bolts and positioned to avoid the center portion so that the guide rail 10 can be mounted on another member. Side walls 13 and 14 extend upright from both side edges of the bottom portion 11. Ball rolling grooves 15 having a semicircular cross section and extending axially are respectively formed in inner surfaces of the side walls 13 and 14. The ball rolling grooves 15 are opposed to and in parallel to each other. The side walls 13 and 14 of the guide rail 10 are formed with notches 16 respectively in inside corners of the upper ends. Rubber magnets 17 are respectively fixed to the notches 16 and extend inwardly so that the upper surfaces of the rubber magnets 17 are co-planar with each other. One end 18 of the guide rail 10 is formed with axial screw holes 20 and 21. The other end 19 of the guide rail 10 is also formed with similar screw holes.

A nut block 30 is a block of a square column shape, and has a ball thread groove 31 formed in an inner surface of a through bore which is formed axially in the center portion of the nut block 30. Ball rolling grooves 32 are formed in the outer surfaces of both sides of the nut block 30 so that the ball rolling grooves 32 respectively correspond to the ball rolling grooves 15 of the guide rail 10. The ball rolling grooves 32 are positioned at the same height as the center line of the through bore having the thread groove 31. Furthermore, through holes 33 are axially formed in the nut block 30 respectively in interior portions of the ball rolling grooves 32 and constitute ball return paths. Extending portions 34 are formed on an upper portion of the nut block 30 and extend laterally and outwardly so that the extending portions 34 extend outwardly beyond both outer side surfaces having the ball rolling grooves 32 formed therein. Grooves 35 are formed respectively below the extending portions 34 and extend axially so that a reduced width portion 36 is formed. On upper surfaces of the extending portions 34, screw holes 37 are formed for mounting another member thereon. A recess 38 is formed in an upper surface of the nut block 30 extending axially between both of the extending portions 34. The recess 38 opens upwardly and has a width wider than the width of the reduced width portion 36. Upper portions of inner walls of the recess 38 protrude slightly inwardly to oppose each other. Guide grooves 39 are formed so that lower surfaces of the slightly protruded portions are slidingly in contact with the End caps 40 are respectively secured to opposite ends of the nut block 30 by screws 42 together with damper members 41 which are respectively attached to outer sides of the end caps 40. Reference numeral 47, FIG. 7, designates an aperture through which the screw 42 is inserted. The damper member 41 is formed by stoving rubber to an iron plate 48 and serves as a seal plate for sealing the inside surfaces including the screw shaft of the ball screw and the ball rolling grooves of the linear guide.

Each of the end caps 40 has an inside end face which is in contact with the nut block 30 and is formed with a pair of curved recesses 43 of a semicircular shape, FIG. 11. One end of each curved recess 43 has a ball scooping projection 44, FIG. 11, which closely enters the ball rolling groove 15 of the guide rail 10. The other end of the projection 44 is in communication with the through hole 33 and serves as the ball return path to form a ball circulating path.

An upper end of the end cap 40 is formed with a slant surface 46 inclined at an angle of about 30 degrees and having a curved portion 45 at the top thereof. The curved portion 45 is continuous with the upper surface of the recess 38. A plurality of balls 50 are rollably inserted between the ball rolling grooves 15 of the guide rail 10 and the ball rolling grooves 32 of the nut block 30 so that the nut block 30 is movable in an axial direction through rolling of the balls 50. With the movement of the nut block 30 in an axial direction, the balls 50 circulate along the ball circulating paths provided in the nut block 30.

Figure 2:
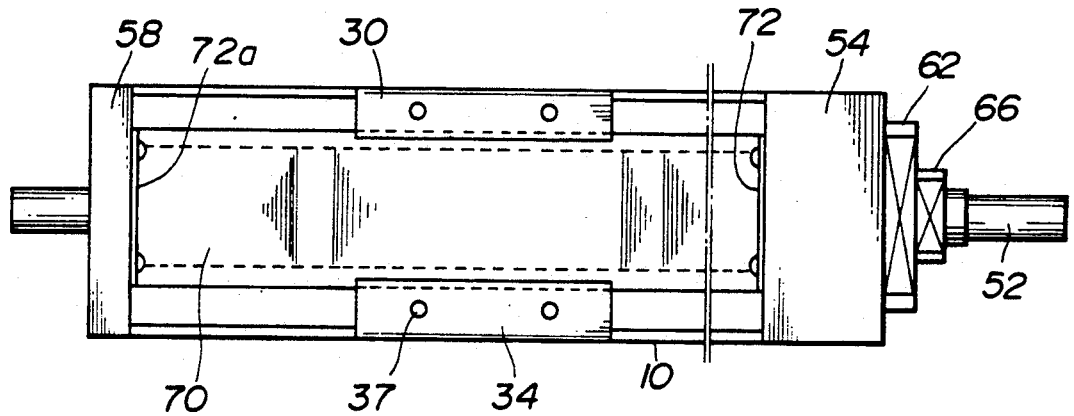
FIG. 2 is a plan view of the feed unit apparatus of FIG. 1.

A feed screw shaft, FIGS. 2 and 12, has a ball thread groove 53 formed in an outer surface. The feed screw shaft 52 engages a ball thread groove 31 formed in the nut block 30 through the balls 50. One end of the feed screw shaft 52 is supported through a ball bearing 56, FIG. 1, by a support unit 54 fixed to one end of the guide rail 10 so that the feed screw shaft 52 is rotatable; but unmovable in the axial direction. The other end of the feed screw shaft 52 is supported through a ball bearing 60 by a cover member 58 fixed to the other end of the guide rail 10. An inner race of the ball bearing 60 is held by the feed screw shaft 52 through a snap ring 61. An outer race of the ball bearing 60 is not held excessively by the feed screw shaft 52 so that the outer race 58 is movable in the axial direction with respect to the cover member 58. An outer race of the ball bearing 56 of the support unit 54 is fixed to the support unit 54 by a cover 62 secured to the support unit 54. An inner race of the ball bearing 56 is clamped towards a step portion 68 of the feed screw shaft 52 by a bearing fixing nut 66 through a collar 64 so that the feed screw shaft 52 is supported by the support 54 rotatably; but unmovably in the axial direction.

The seal plate 70 is a strip-like sheet plate member made of a magnetic material, and has one end fixed to the support unit 54 by a screw 74 through a pressing plate 72, and the other end of the seal plate 70 is fixed by a screw 74a to the cover member 58 through a pressing plate 72a. The seal plate 70 covers an upper surface of the guide rail 10 over the whole length.

Figure 3:
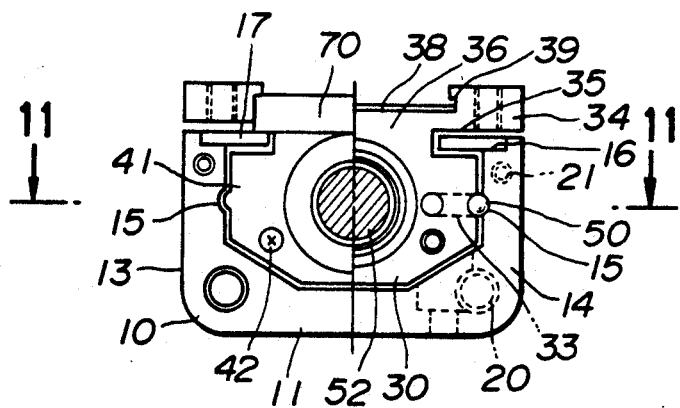
FIG. 3 is a left side view of the feed unit apparatus of FIG. 1 in which the left-hand side from the center is exposed to view when the member 58 is removed, and right-hand side shows when viewed in a direction of arrows along line of 2—2 in FIG. 1 and members 40 and 41 are removed and the curved portion of the seal plate 70 is omitted.
Figure 4:
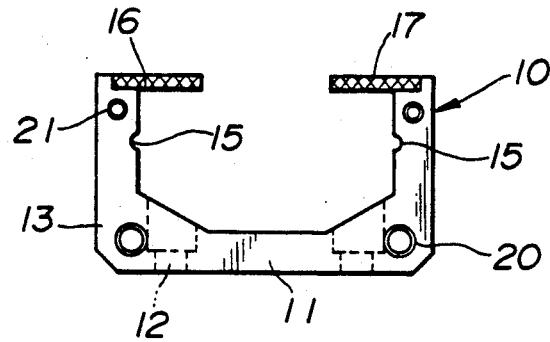
FIG. 4 is a side view of the guide rail shown in FIG. 1.
Figure 5:
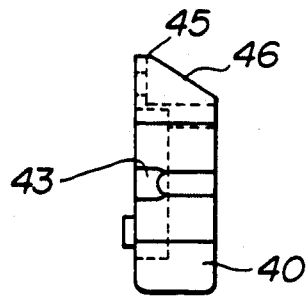
FIGS. 5 and 6 are respectively side and front views of the end cap.
Figure 6:
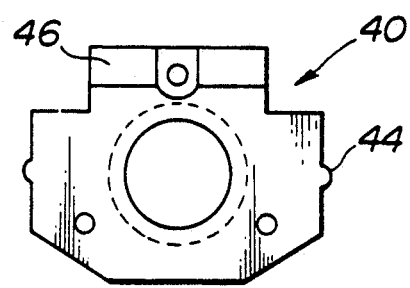

The seal plate 70, FIG. 3, has a width adapted to engage the recess 38 formed in the upper surface of the nut block 30 with a slight clearance. An expanded portion 76 is formed expanding upwardly at a portion corresponding to the nut block 30. Both axial end portions of the seal plate 70 are magnetically attracted to closely contact upper surfaces of the rubber magnets 17 provided on the guide rail 10 at front and behind portions of the nut block 30. Both edge portions of the seal plate 70 are inserted in the guide grooves 39, and upper surfaces of the edge portions of the seal plate 70 are slidingly in contact with lower surfaces of shoulder portions of the guide grooves 39.

Figure 7:
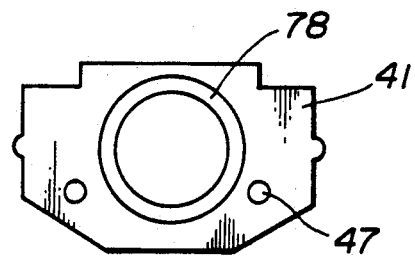
FIGS. 7 and 8 are respectively side and front views of the damper member shown in FIG. 3.
Figure 8:
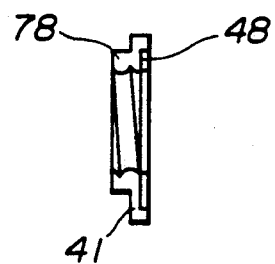

The damper member 41, FIGS. 1, 7 and 8, fixed to the end cap 40 has an annular protruded portion 78 made of rubber to surround the feed screw shaft 52. When the nut block 30 moves in an axial direction by the rotation of the feed screw shaft 52, at a stroke end of the movement, the damper member 41 abuts against an annular stopper 80 which is fixed to an end of the feed screw shaft 52 by a pin 82. The stopper 80 has a hole 84, FIGS. 9 and 10, for fitting the pin 82 thereinto. The damper member 41 and the stopper 80 constitute a stopper means. In this embodiment, although the stopper is provided on the feed screw shaft, the stopper may also be provided on the cover member 58. In other words, the stopper is only required to be provided on a stationary side when the nut block 30 is moved. Accordingly, at the stroke end of the movement, even when the nut block 30 collides against the stopper 80, the impulse is relieved and the nut block 30 is prevented from biting the stopper 80 which could result in a failure of the nut block 30 to return. Furthermore, as shown in FIG. 12, a length of the stopper means is selected so that a plane portion L remains between the fixed end and the curved portion of the seal plate 70 when the nut block 30 stops at the end of the stroke.

Figure 13:
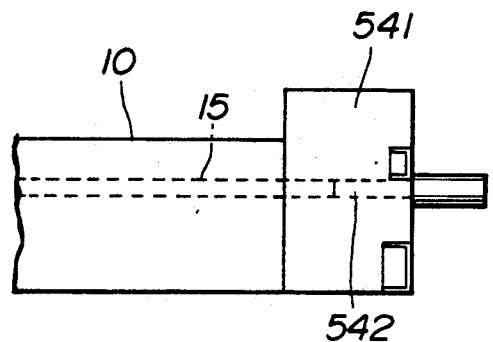
FIG. 13 is a front view showing a modification of mounting the support unit to the guide rail.
Figure 14:
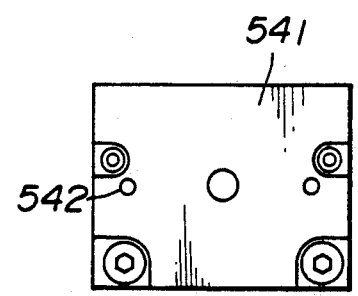
FIG. 14 is a right side view of the support unit and the guide rail shown FIG. 13.

FIGS. 13 to 22 show modifications of the support unit 54 and its associated guide rail 10 to facilitate the mounting of the support unit 54 to the end of the guide rail 10. In FIGS. 13 and 14, a pin 542 which engages the ball rolling groove 15 of the guide rail 10 is planted in a support unit 541, and the positioning of the support unit 541 is carried out by the aid of the pin 542. By this arrangement, the assembling of the support unit 541 becomes very easy.

Figure 15:
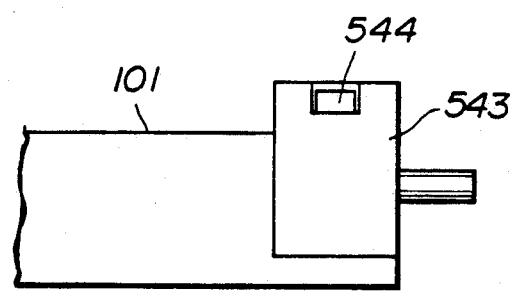
FIG. 15 is a front view showing another modification of mounting the support unit to the guide rail.
Figure 16:
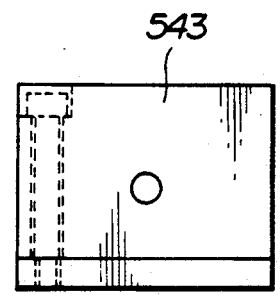
FIG. 16 is a right side view of the support unit and the guide rail shown in FIG. 15.
Figure 17:
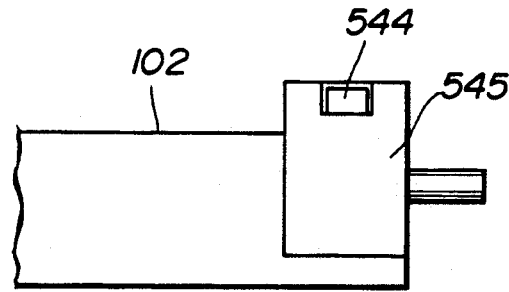
FIG. 17 is a front view showing another modification of mounting the support unit to the guide rail.
Figure 18:
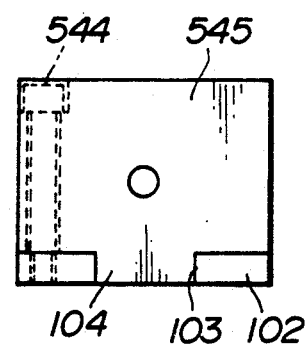
FIG. 18 is a right side view of the support unit and the guide rail shown in FIG. 17.

In a second modification shown in FIGS. 15 and 16, a side wall portion of an end of a guide rail 101 is cut out, and a support unit 543 is clamped by a bolt 544 thereto extending from an upper surface thereof. In a third modification shown in FIGS. 17 and 18, an end of a guide rail 102 is cut out as in the second modification, and a slot 103 is formed in a bottom portion at the center thereof. On the other hand, a protruding portion 104 is formed at a lower portion of a support unit 545 so that the protruding portion 104 is fitted into the slot 103 to thereby facilitate positioning of the support unit 545.

Figure 19:
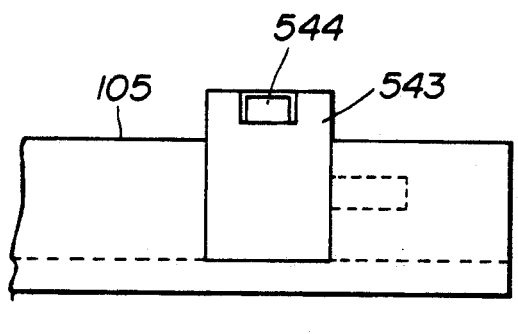
FIG. 19 is a front view showing another modification of mounting the support unit to the guide rail.
Figure 20:
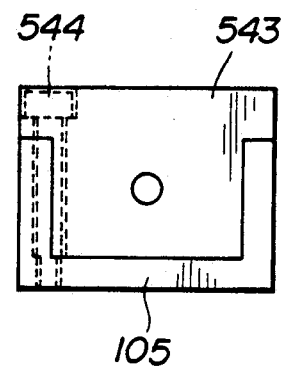
FIG. 20 is a right side view of the support unit and the guide rail shown in FIG. 19.
Figure 21:
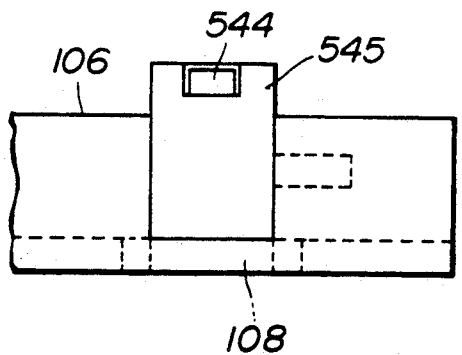
FIG. 21 is a front view showing another modification of mounting of the support unit mounted to the guide rail.
Figure 22:
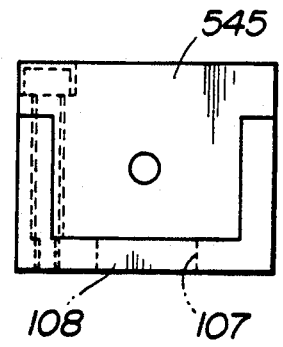
FIG. 22 is a right side view of the support unit and the guide rail shown in FIG. 21.

In a fourth modification shown in FIGS. 19 and 20, side walls of a guide rail 105 are cut out at an inland portion from an end of the guide rail 105 so that an axial length of the cutout portion matches an axial length of the support unit 543. The support unit 543 is clamped to a bottom portion of the guide rail 105 by a bolt 544. In a fifth modification shown in FIGS. 21 and 22, side walls of a guide rail 106 are cut out for an axial length which matches an axial length of a support unit 545. A long slot 107 is formed in a bottom portion of the guide rail 106. On the other hand, a protruded portion 108 is formed on a lower surface of the support unit 545 for fitting into the long slot 107. Owing these modifications, the assembly of the support unit becomes easy.

When the feed screw shaft 52 is rotated by a driving device, the nut block 30 is moved relative to the guide rail 10 to the right or left in FIG. 2. Since the conversion of motion between the feed screw shaft 52 and the nut block 30 is performed by the ball screw, the efficiency is good and the accuracy is satisfactory. Further, since the nut block 30 is movably supported in an axial direction by the guide rail 10 through the balls which circulate, a friction loss in the axial movement is small.

When the nut block 30 is moved, a front end of the seal plate 70 disposed on the upper surface of the nut block 30 is raised with the movement of the nut block 30 by the slant surface 46 of the end cap 40 and parted from the rubber magnets 17. A rear end of the seal plate 70 is attracted by the rubber magnets 17 as the slant surface 46 of the end cap 40 is moved away from the rear end of the seal plate 70. This attracted portion of the seal plate 70 is moved with the movement of the nut block 30. In other words, a curved portion at the end of the expanded portion 76 of the seal plate 70 is moved with the movement of the nut block 30, and the expanded portion 76 expanded at the portion corresponding to the nut block 30 is moved together with the nut block 30.

In the present invention, a nut block is disposed in the inside of a guide rail movably in an axial direction through rolling balls. Laterally extending portions are provided on the nut block to cover upper end portions of both side walls of the guide rail at positions close to the upper end portions. A seal plate expanding upwardly at a portion corresponding to the extended portions is provided to cover the nut block and also to cover an opening of the guide rail between the upper ends of both the side walls of the guide rail over the whole length of the opening. Accordingly, a feed unit apparatus which is compact, easy to handle, and excellent in dust sealing properties can be obtained in which dust is prevented from entering the surfaces of the ball rolling grooves from the outside, the grease is prevented from scattering to the outside due to the rotation of the feed screw shaft.

When the seal plate is made of a magnetic material and magnets are provided on the upper ends of both the side walls of the guide rail, satisfactory sealing can also be insured.

By providing a slant surface at an upper portion of the end cap so that the slant surface slidingly contacts an inner surface of a curved portion of the seal plate, the sliding resistance of the end cap with respect to the expanded portion of the seal plate is stabilized. Furthermore, when guide grooves are formed in the laterally extending portions of the nut block to slidingly contact an upper surface of the seal plate, the curvature of the curved portion of the seal plate is stabilized and the operation resistance becomes uniform. Thus, a feed unit apparatus having satisfactory operating characteristics can be obtained.

Even when the nut block abuts against a stopper at the end of a stroke, since a plane portion of the seal plate attracted to rubber magnets remains at the outside of the curved portion of the seal plate, an excessively large stress is not created and the life of the seal plate is not reduced.

Furthermore, when the positioning of the support unit is effected by a pin which engages the ball rolling groove of the guide rail, since it is only required to determine the position of the pin by a jig, an advantage is provided in that the assembly is very easily achieved.

What is claimed is:

1. A feed unit apparatus comprising:
   a guide rail of a continuous length having an upwardly opening U-shaped cross section and axial ball rolling grooves opposing each other formed in inner surfaces of side walls thereof;
   a nut block having ball rolling grooves formed in both lateral sides respectively corresponding to the ball rolling grooves of the guide rail and having through bores serving as ball return paths respectively corresponding to the ball rolling grooves of the nut block, the nut block including an axial through bore having a ball thread groove formed in a center portion thereof, the nut block being loosely fitted into an inside of the guide rail with a minute clearance between an outer peripheral surface of the nut block and an inner peripheral surface of the guide rail, a portion of the nut block including the axial through bore having the ball thread groove formed therein constituting a nut portion, and another portion of the nut block including the ball rolling grooves formed in both lateral sides and the through bores serving as the ball return paths and constituting a linear movement ball bearing portion formed integrally with each other;
   end caps respectively fixed to opposite axial ends of the nut block, each of the end caps having ball circulating paths respectively communicating corresponding ones of the ball rolling grooves and the ball return paths of the nut block with each other;
   a plurality of balls rollably fitted between the ball rolling grooves of the guide rail and the ball rolling grooves of the nut block;
   a feed screw shaft inserted into and engaged through the balls with the through bore in the nut block having the ball thread groove formed therein;
   a support unit fixed to one end of the guide rail for rollably and axially unmovably supporting the feed screw shaft;
   the nut block being provided with axially extending portions extending laterally outward from both upper side portions thereof beyond both outer surfaces having the ball rolling grooves formed therein so that the extending portions are respectively positioned close to the upper ends of both of the side walls of the guide rail to cover the upper ends of the side walls;
   the nut block being formed with an axially extending recess in an upper surface between the extending portions, with the recess opening upwardly between the extending portions;
   axially extending guide grooves respectively formed in the extending portions and opening to the recess;
   the nut block having axially extending grooves respectively formed in both outer side surfaces thereof below the extending portions to form a reduced width portion in the nut block, the width of the recess being greater than the width of the reduced width portion of the nut block;
   the guide rail being provided with a pair of axially extending magnets respectively mounted on the upper ends of the side walls so that inner edge portions of the magnets protrude inwardly into the axially extending grooves in the nut block forming the reduced width portion of the nut block;
   each of the end caps being formed with a slant surface on an upper end portion thereof, the slant surface having curved portions respectively contiguous with an upper surface of the nut block and contiguous with upper surfaces of the magnets on the side walls of the guide rail; and
   a flexible seal plate formed of a magnetic sheet material having opposed ends respectively secured to opposed end portions of the guide rail, the flexible seal plate being received within and slidably engaging the recess formed in the upper surface of the nut block between the extending portions of the nut block and slidably guided by the guide grooves in the inner side walls of the extending portions and slidably guided by the slant surface on the upper end portion of each of the end caps so that an expanded portion expanding upwardly is formed in the seal plate at a portion corresponding to the nut block to allow axial movement of the nut block while maintaining sealing of the minute clearance between the nut block and the guide rail, the flexible seal plate being attracted at the lateral side portions thereof by the magnets mounted on the side walls of the guide rail to thereby seal the minute clearance between the nut block and the guide rail before and behind the nut block.

2. The feed unit apparatus according to claim 1 further comprising:
   stopper means disposed between the nut block and a member at the side of the guide rail for limiting the range of movement of the nut block, the stopper means including a damper so that the curved portion at the end of the expanded portion of the seal plate does not move to an axial end of the seal plate due to the movement of the nut block.

* * * * *